US005527125A

United States Patent [19]

Kreuzer et al.

[11] Patent Number: 5,527,125

[45] Date of Patent: Jun. 18, 1996

[54] TRANSPORTABLE MEDICAL APPARATUS, IN PARTICULAR INFUSION SUPPLY APPARATUS

[75] Inventors: Friedhelm Kreuzer, Puchheim; Armin Stöckl, Ohlstadt, both of Germany

[73] Assignee: Kreuzer GmbH & Co. OHG, Puchheim, Germany

[21] Appl. No.: 211,597

[22] PCT Filed: Aug. 10, 1993

[86] PCT No.: PCT/EP93/02119

§ 371 Date: Apr. 5, 1994

§ 102(e) Date: Apr. 5, 1994

[87] PCT Pub. No.: WO94/04113

PCT Pub. Date: Mar. 3, 1994

[30] Foreign Application Priority Data

Aug. 17, 1992 [DE] Germany ............................ 9210979 U

[51] Int. Cl.$^6$ ........................................................ F16B 2/02

[52] U.S. Cl. .......................... 403/325; 403/326; 403/334; 403/12; 248/316.3; 5/503.1; 5/658

[58] Field of Search .................................... 403/325, 322, 403/321, 326, 324, 24, 3, 4, 12, 49, 320, 315, 327, 333, 334, 389, 396; 248/231.3, 231.2, 316.3; 5/503.1, 658; 604/131, 151

[56] References Cited

U.S. PATENT DOCUMENTS

| | | | |
|---|---|---|---|
| 2,287,117 | 6/1942 | Montalto | 403/324 X |
| 3,512,387 | 5/1970 | Ames . | |
| 4,489,454 | 12/1984 | Thompson | 5/503.1 |
| 4,511,158 | 4/1985 | Varga et al. | 5/658 X |
| 4,585,369 | 4/1986 | Manesse et al. | 403/322 |
| 4,724,844 | 2/1988 | Rafelson . | |
| 4,795,122 | 1/1989 | Petre . | |
| 5,060,961 | 10/1991 | Bontrager | 403/389 X |
| 5,117,521 | 6/1992 | Foster et al. . | |
| 5,135,191 | 8/1992 | Schmuhl | 5/658 X |
| 5,344,169 | 9/1994 | Pryor et al. | 5/503.1 X |

FOREIGN PATENT DOCUMENTS

| | | | |
|---|---|---|---|
| 0400407A1 | 12/1990 | European Pat. Off. . | |
| 2620749 | 3/1989 | France | 403/49 |
| 3145310A1 | 5/1983 | Germany . | |
| 3917892C1 | 12/1990 | Germany . | |
| WO90/03157 | 4/1990 | WIPO . | |

*Primary Examiner*—Kenneth J. Dorner
*Assistant Examiner*—Harry C. Kim
*Attorney, Agent, or Firm*—Donald Brown; George W. Neuner

[57] ABSTRACT

An infusion supply apparatus is provided which is attachable to a stationary apparatus such as an overhead support (1), on the one hand, and with a patient transporting apparatus (3), on the other hand. The transfer from one such apparatus to the other shall be possible in a simple and locked manner. To this end, the stationary apparatus (1), the patient transport apparatus (3) and a handle (12) each have a coupling member (2, 4, 13) and a support (7) for the medical appliances comprises a coupling (8) cooperating with respective two such coupling members. The coupling (8) comprises a lock means (16, 17) which unlocks in case of engagement of two coupling members in the coupling means for selective detachment of an engagement and locks in case of engagement of a single one of the coupling members.

14 Claims, 6 Drawing Sheets

TRANSPORTABLE MEDICAL APPARATUS, IN PARTICULAR INFUSION SUPPLY APPARATUS

The invention relates to a transportable medical apparatus, in particular an infusion supply apparatus, comprising a carrier and appliances mountable thereto for the care of patients.

Such an apparatus is disclosed in document DE-A-39 17 892.

Further, the document DE-A-31 45 310 discloses an appliance support system for the medical technology wherein the appliance is mounted to an appliance frame by means of guide rails. The appliance frame can be connected to a lift truck for transport thereof and to a frame receiver at the place of operation by means of the guide rails and two locks cooperating with a locking bar.

This system is relatively space-consuming and intended for heavy and voluminous appliances.

It is the object of the invention to modify an apparatus of the generic type in such a manner that the coupling and transfer from a stationary apparatus to the patient transport apparatus and vice versa is achieved in a particularly simple and space-saving manner.

This object is achieved by the transportable medical apparatus as disclosed herein.

BRIEF DESCRIPTION OF THE DRAWING

Embodiments are now described with reference to the figures. In the figures

DETAILED DESCRIPTION OF THE INVENTION

Figure 1:
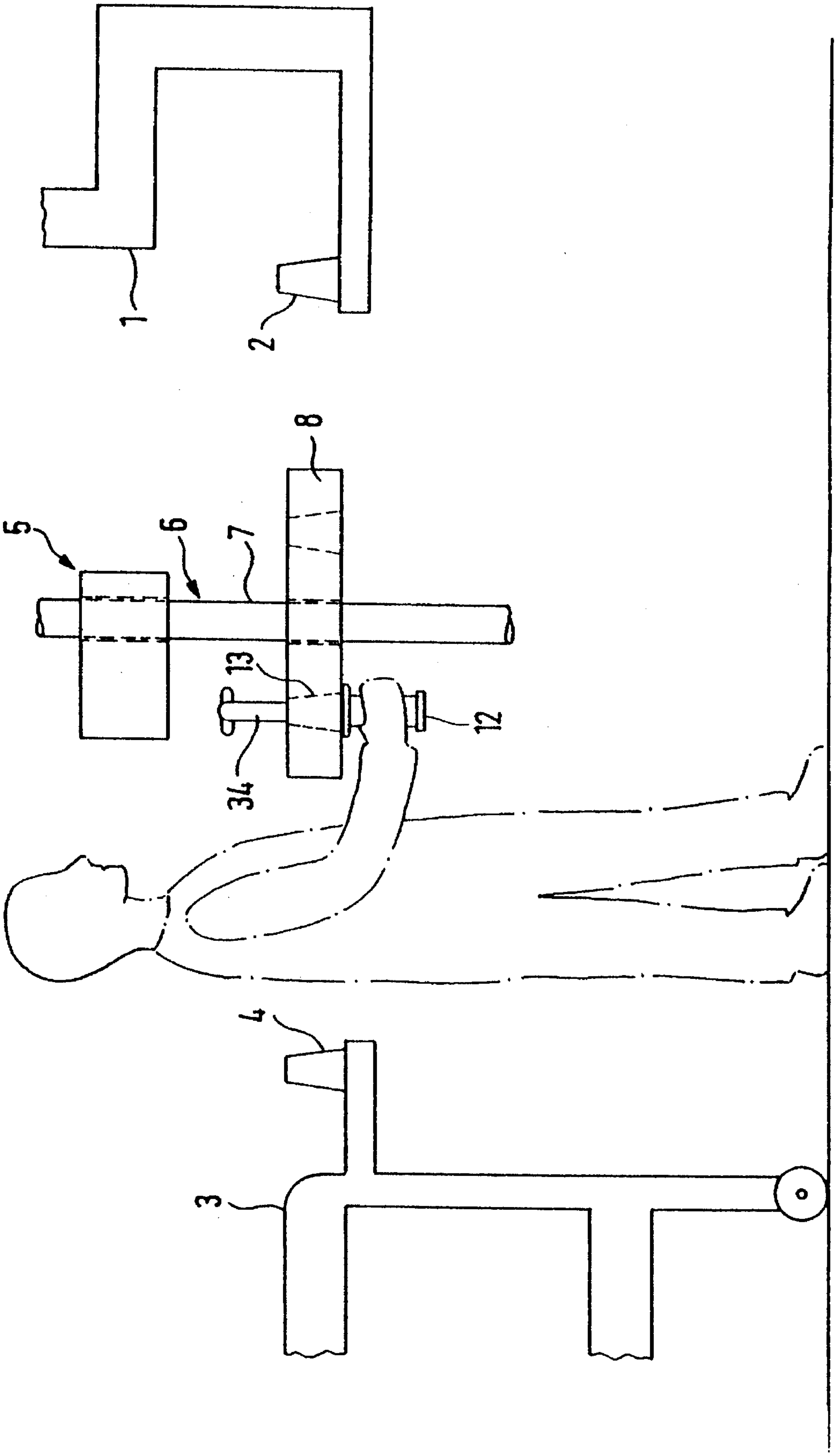
FIG. 1 is a schematic representation of a transportable medical apparatus with support and a patient transporting apparatus.

FIG. 1 shows a part of an overhead support 1 with a vertically upward extending peg 2 mounted thereto. A further vertically upward extending peg 4 is provided at a frame part of bed 3 serving as patient transporting apparatus.

Figure 2:
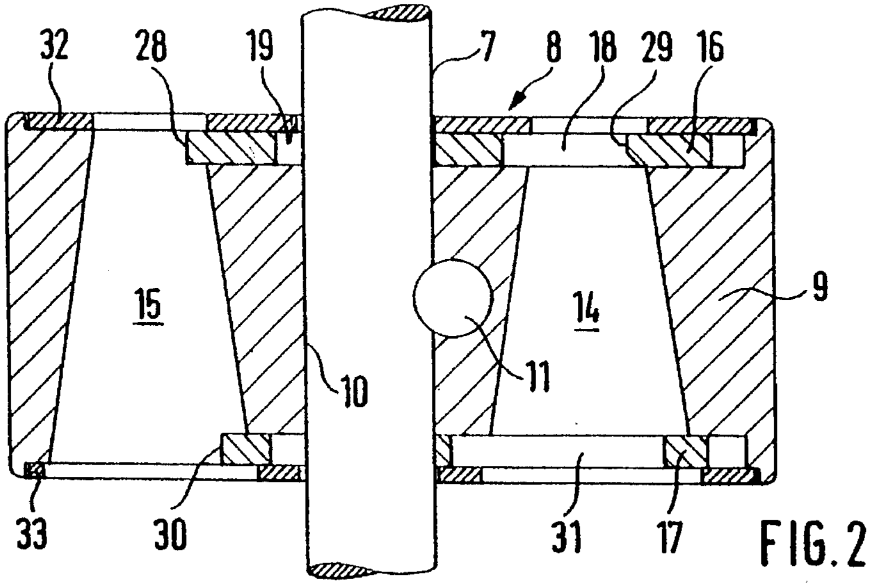
FIG. 2 is a sectional view of the coupling means cooperating with the coupling members in an uncoupled state.

As shown in FIGS. 1 and 2, a carrier 6 supporting the medical appliances 5 of the infusion supply apparatus comprises a support column 7 for fastening the appliances 5 thereto and a plate-shaped member forming a coupling means 8. The coupling means 8 comprises a substantially plate-shaped base 9. A vertical bore 10 receiving the support column 7 extends through the center of the plate. A locking member 11 formed as an asymmetrically supported rotary pin is provided for locking the coupling means 8 to the support column 7. By rotating this member, the lock between both parts can be released for sliding the coupling means up and down on the support column 7.

A handle 12 is provided for transferring the appliances at the carrier 6. The handle comprises an as well vertically upward projecting peg 13 at its upper end. All three pegs 2, 4 and 13 are aligned parallel to each other (in operation). Further details of the handle are described further below.

Figure 4:
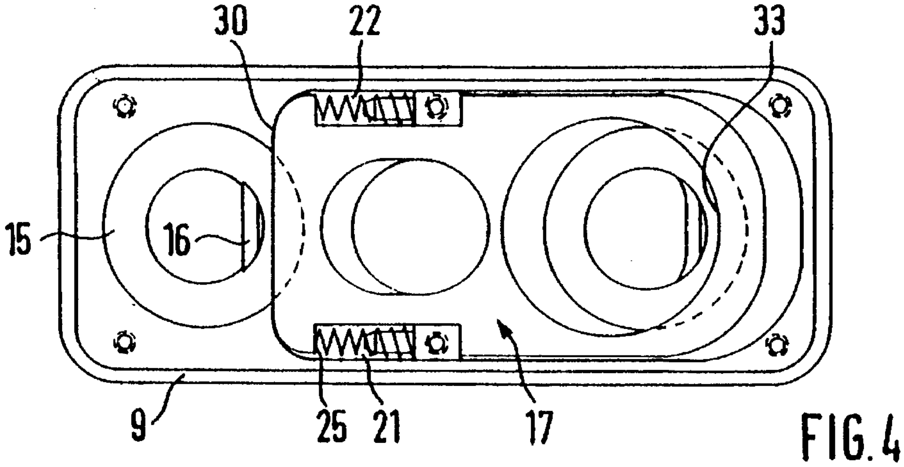
FIG. 4 is a bottom view of the apparatus shown in FIG. 2 with removed cover.

The coupling means 8 comprises two recesses 14, 15 extending parallel to the axis of the bore 10 receiving the support column and symmetrically thereto. As best shown in FIG. 2, both recesses have conically upward tapering walls. As best shown in the FIGS. 2 to 4, a first slider is provided close to the upper edge of the recesses, and a second slider 17 is provided close to the lower edge of the recesses. Both sliders are displaceable in a direction perpendicular to the direction of the axis of the recesses 14 and 15 and therefore to the axis of the support column 7.

Figure 3:
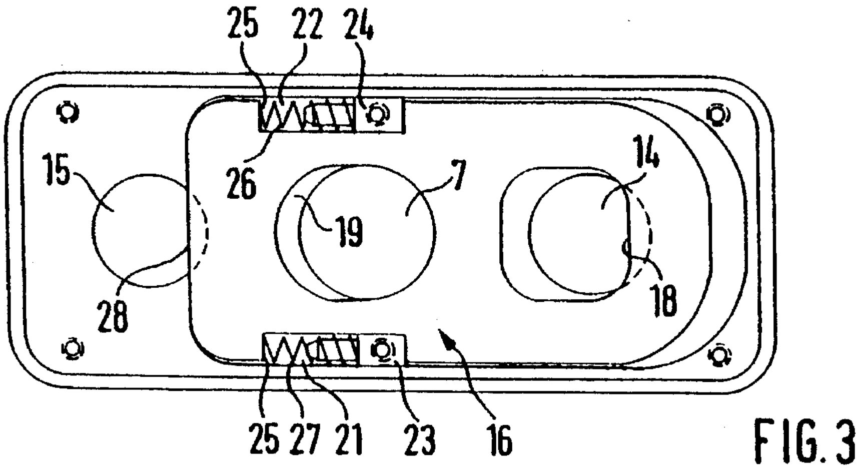
FIG. 3 is a top view of the apparatus shown in FIG. 2 with the cover being removed.

The first slider 16 comprises a first hole 18 having a dimension such that it corresponds to the size of the recess 14 if the first slider is in a respective retracted position. Further, a second hole 19 is provided which is formed as an elongate hole, as best shown in FIG. 3. The diameter is selected so that the support column 7 is guided within the elongate hole. Stops 23, 24 are arranged in lateral recesses 21, 22 of the slider 16 and rigidly connected to the base 9. Prestressed compression springs 26, 27 are disposed between the stops 23, 24 and opposite stop faces 25 of the recesses 21, 22. The dimensions of the first slider 16 and of the first hole 18 are such that the free front edge 28 of the slider and an edge 29 of the hole 18 project into the recesses 14 and 15, respectively, in the position of the slider caused by the prestressing of the springs. On the other hand, the slider is displaceable against the force of the springs to completely clear the recesses 14, 15. The first slider is retained and covered by a cover 32 screwed to the base 9.

The second slider 17 is formed corresponding to the first slider 16 and has a corresponding spring prestress. The only difference concerns the dimensions inasfar as its free front edge 30 and its first hole 31 are dimensioned to project into the recesses 14, 15, respectively, in the unrestricted position caused by the spring prestress and to clear both recesses when retracted against the spring prestress. The second slider is also slidably covered by a cover 33 screwed to the base.

Figure 5A:
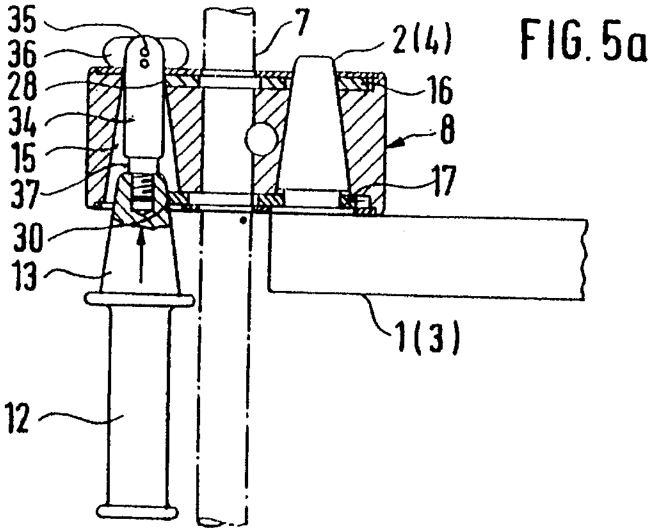
FIG. 5*a* shows the apparatus of FIG. 2 with a peg of a patient transporting apparatus or of the stationary apparatus being locked therein.
Figure 5B:
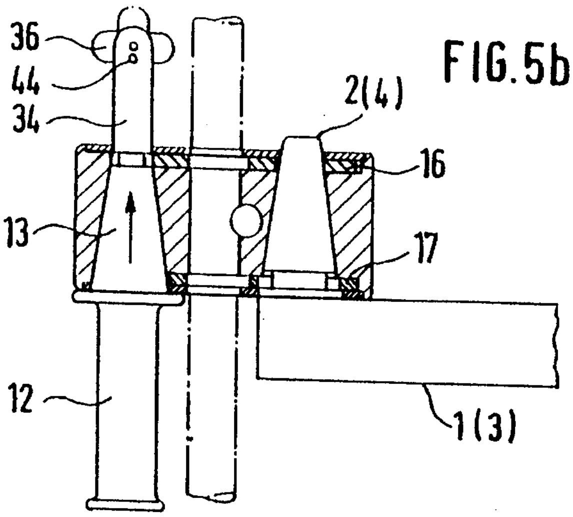
FIG. 5*b* is a representation similar to FIG. 5*a* with two pegs being introduced into the coupling means.
Figure 5C:
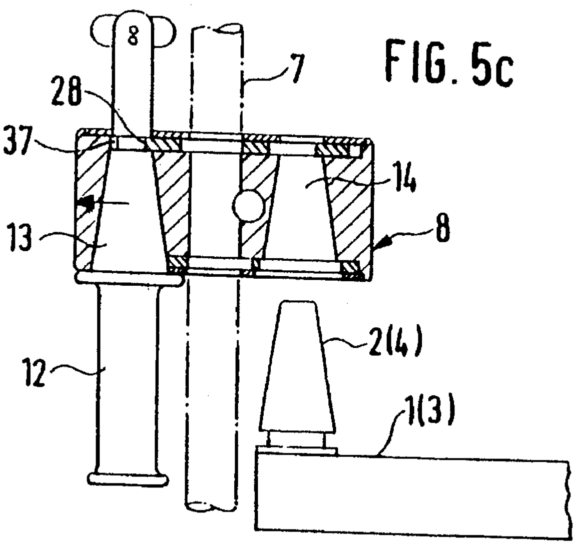
FIG. 5*c* is a representation similar to FIG. 5*a* with only the peg of the handle being introduced and locked.
Figure 6:
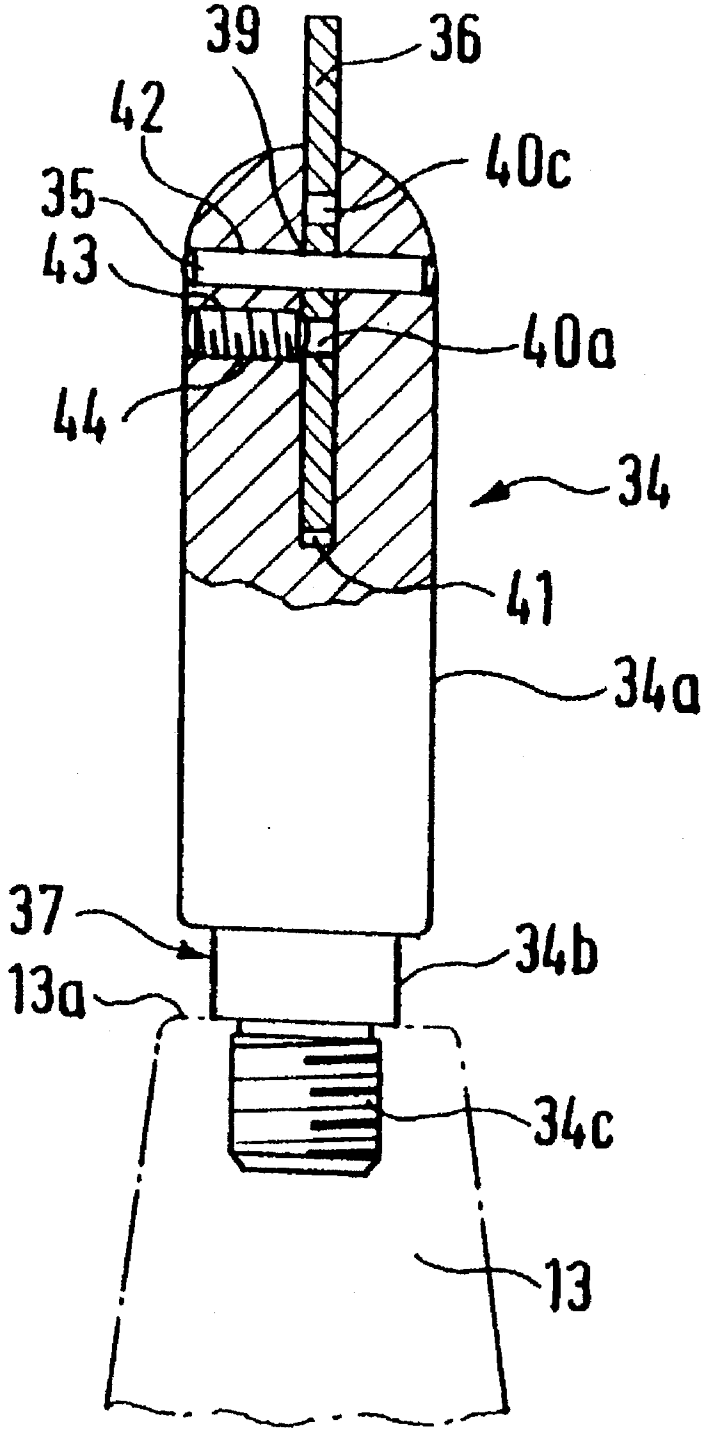
FIG. 6 shows a detail of the safety member of the handle in sectional representation.

As shown in FIGS. 5 and 6, the peg 13 connected to the handle 12 is shorter than the pegs 2 and 4 and has a substantially cylindrical safety member 34 with a first portion 34*a*, a second portion 34*b* and a third (threaded) portion 34*c* following the second portion. The diameter of the first portion 34*a* is selected so that this portion can be passed through the recess 15. The thread 34*c* of the safety member 34 is screwed into the front face 13*a* of the peg 13 from above so that the safety member forms a prolongation of the peg. At the end thereof opposite to the peg 13, the safety member has a safety locking bar 36 which can be rotated around an axis 35 and which is described in detail further below.

The second portion 34*b* of the safety member adjacent to the threaded portion 34*c* has a reduced diameter as compared to the first portion 34*a* so that an annular recess 37 is formed in the peg 13 with a screwed-in safety member. The height of the second portion 34*b* is slightly larger than the thickness of the first slider 16 so that the slider fits into the recess if the coupling means rests on the peg 13.

The remaining pegs, i.e., the peg 2 at the overhead support 1 and the peg 4 at the bed 3, are formed to have annular recesses 38 functionally corresponding to the recess 37 at a small distance from their lower edge. The position of the recess 38 in axial direction is selected so that the recess lies in the plane of the second slider 20 if the coupling means 8 rests on the peg 2 or 4. The dimensions concerning depth and height of the annular recess are again selected so that the second slider just fits into the recess 38.

In the embodiment just described, the cone angle of the pegs and of the corresponding recesses is about 22°. This allows a swivelling of the coupling means 8 around the respective peg but produces a defined braking action against unintended swivelling by means of the angle of inclination and the gravitational force.

In the shown embodiment, the safety locking bar 36 for the peg 13 is an elongate disk having a width which is smaller than the smallest diameter of the recess 15, and a length which is larger than the smallest diameter. The disk has a central bore 39. The first portion 34*a* of the safety member 34 comprises a slot 41 and a through hole 42 extending perpendicular to the plane of the slot. The slot extends along the longitudinal axis of the cylinder from the end thereof opposite to the second portion 34*b*. The slot 41 receives the safety locking bar by means of a shaft 35 which is inserted through the central bore 39 of the safety locking bar and through the through hole 42 of the safety member and which rotatably retains the safety locking bar 36 in the slot 41. The width and depth of the slot 41 must be selected so as to allow a free rotation of the safety locking bar 36 therein around the shaft 35.

The first portion 34*a* of the safety member comprises a second bore 43 extending parallel to the through hole 42 and spaced therefrom towards the second portion 34*b*. The second bore 43 ends at the slot 41. Apart from the central bore, the safety locking bar 36 has four further bores 40*a*, 40*b*, 40*c*, and 40*d* positioned at the axes of symmetry of the bar and having equal distances to the center thereof. The distance thereof from the central bore 39 is equal to the spacing between the bores 42 and 43 of the safety member.

The bore 43 of the safety member receives a spring-biased thrust member 44 which catches the bores 40*a*–40*d* in respective positions of the safety locking bar 36 with respect to the shaft 35. Hence, the safety locking bar is selectively held in a first position with the longitudinal axis thereof being perpendicular to the longitudinal axis of the safety member and in a second position with the longitudinal axis thereof being parallel to the longitudinal axis of the safety member. The first position is shown in full lines in FIGS. 5*a*–5*c*, whereas the second position is shown in dotted lines in FIG. 5*b* and in cross section in FIG. 6.

If the coupling means 8 is locked on one of the pegs 2 and 4, the lower edge of the locking bar 36 being in its first position rests on the upper side of the housing 9 of the coupling means 8, and the handle 12 hangs down from the housing 9. Owing to the fact that the length of the safety locking bar 36 is larger than the diameter of the recess 15 at the upper side of the housing 9, the locking bar unloosably connects the handle with the coupling means in this position wherein the handle is not locked to the coupling means.

However, in the second position of the locking bar wherein the longitudinal axis thereof coincides with the longitudinal axis of the safety member 35, the locking bar no longer laterally projects beyond the diameter of the recess 15 so that the handle can be pulled out from the recess 15 downwards together with the peg 13 and the safety member 35.

In the following, the operation of the described apparatus shall be explained in connection with the transfer of the coupling means 8 supporting the support column 7 from the peg 2 to the handle 12.

At first, the support column 7 together with the coupling means 8 is supported and guided on the peg 2 of the overhead support 1 in the manner shown in FIG. 5*a*. A lock is obtained by the second slider being in its position shown in FIG. 2 caused by the spring prestress and therefore engaging the annular recess 38. The handle 12 loosely hangs within the recess 15 of the coupling means 8.

For transferring the support column together with the coupling means the handle 12 with the peg 13 is grabbed and raised so that the peg 13 is inserted into the recess 15. During the insertion, the peripheral surface of the peg 13 pushes the front edge 30 of the slider 16 projecting into the recess 15 out of the recess against the spring force. This causes a displacement of the first hole 31 so that it coincides with the recess 14, and the peg 2 is simultaneously unlocked. This is shown in FIG. 5*b*.

Thereupon, the handle 12 is pressed upwards to such an extent that the coupling means 8 together with the support column 7 and the appliances 5 mounted thereto is lifted off from the peg 2. As soon as the peg 2 has left the recess 14 to such an extent that the peripheral surface of peg 2 no longer presses against the edge of the spring-biased first slider 16, the front edge 28 of the first slider is pushed by the spring prestress into the annular recess 37 and therefore locks the coupling means 8 to the peg 13, as shown in FIG. 5*c*.

The transfer of the coupling means 8 together with the support column 7 to the peg 4 of the bed or of the patient transporting apparatus, respectively, occurs in reversed manner by vertical alignment of the recess 14 with the peg 4, lowering thereon and finally lowering the peg 13 and locking the coupling means 8 to the peg 4. When releasing the handle 12, the safety member 34 again slides downwards within the recess 15 until the safety locking bar being in its first position—transverse to the safety member—rests on the housing 9, and the handle hangs freely from the coupling means 8. If it is intended to completely remove the handle 12, the locking sheet 36 is rotated around the shaft 35 until it catches its second position which was described in more detail above. Thereupon, the handle can be downwardly withdrawn from the housing 9 together with the peg and the safety member.

In the above-described embodiment, the peg of the handle has an annular recess at its upper edge, whereas the other pegs have an annular recess at their lower edge. It is possible to reverse this arrangement. It is however important that there is a difference in this respect between the peg of the handle, on the one hand, and the other pegs, on the other hand.

In the described embodiment, the safety member which protects the handle against loss comprises a rotatable safety locking bar. According to a modified embodiment, the safety locking bar is replaced by a split pin or bolt placed through a bore corresponding to the through hole 42 or any other member which is suitable to prevent the safety member from slipping out of the recess of the coupling means in an unlocked state of the handle 12.

Figure 7A:
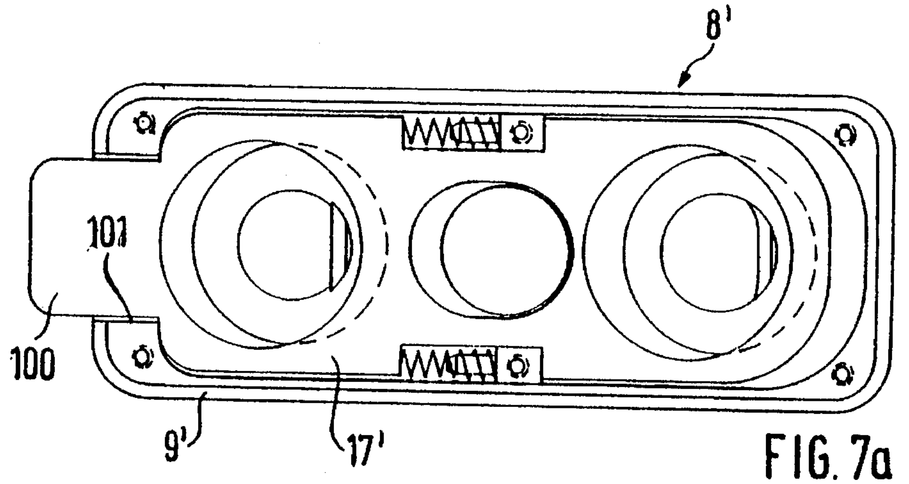
FIGS. 7*a*–7*c* show views corresponding to FIG. 2–FIG. 4 of a modified embodiment.
Figure 7B:
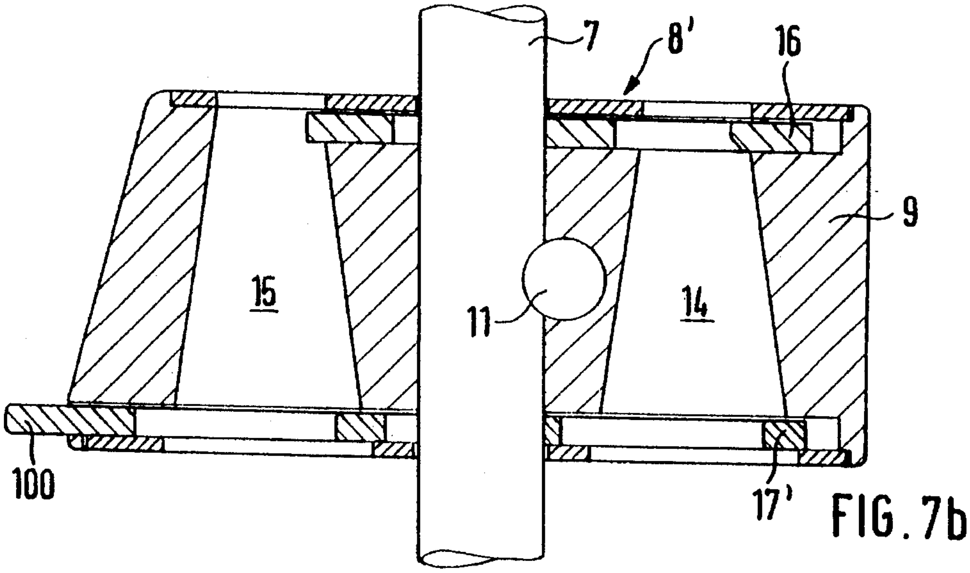
Figure 7C:
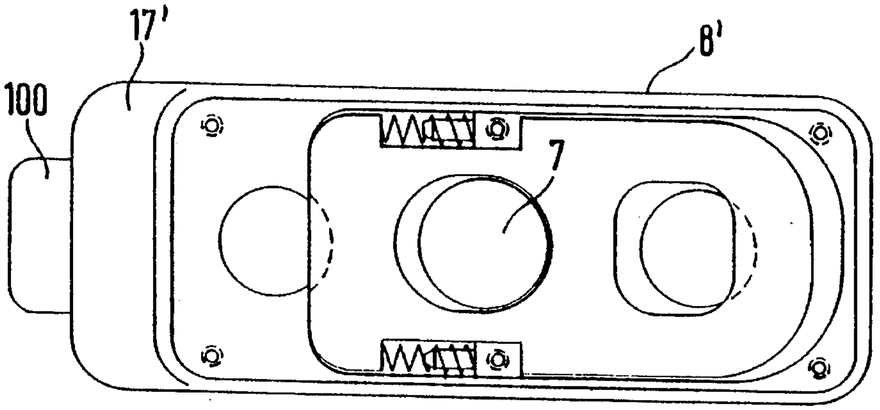
Figure 8A:
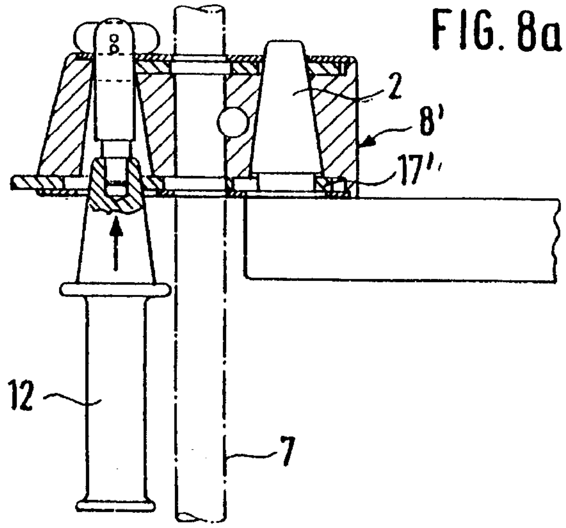
FIGS. 8*a*–8*c* show views corresponding to FIG. 5*a*–FIG. 5*c*of the modified embodiment.
Figure 8B:
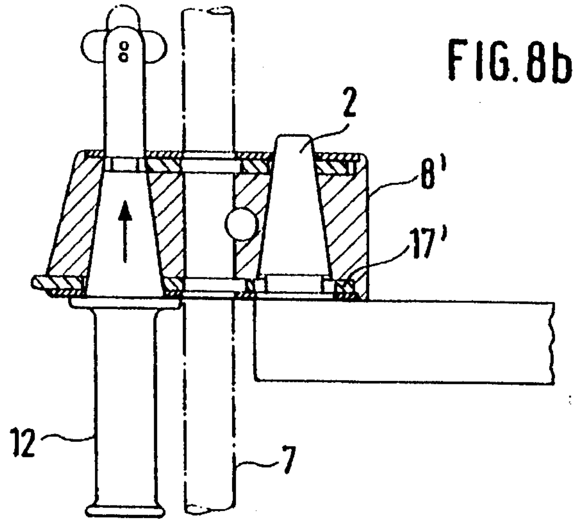
Figure 8C:
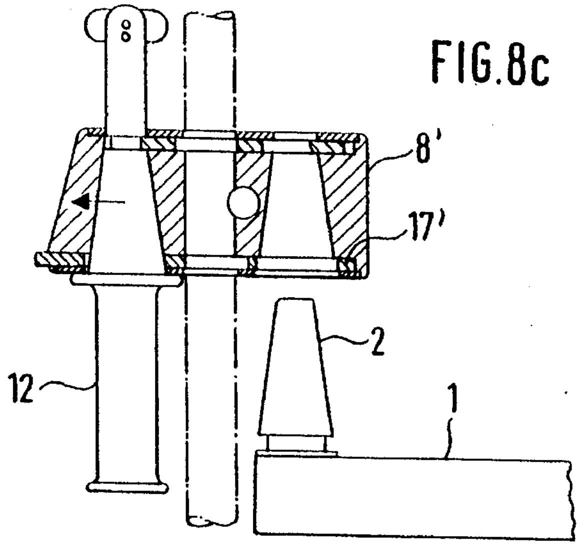

The apparatus shown in the FIGS. 7_a_, 7_c_, and 8_a_, 8_c_ differs from the embodiment described above merely in that the second slider 17 is replaced by a slider 17' which has a nose 100 projecting outwardly beyond the base 9' at the end where the slider is in its spring-biased position. The nose extends outwardly through a hole 101 provided therefor within the base 9'. All other features are identical to the above-described embodiment.

The nose 100 allows to unlock the connection in cases where the handle 12 is unavailable by moving the slider 17' by pressing onto the nose in a direction against the spring prestress.

We claim:

1. A transportable medical system in particular for infusion supply, said medical system comprising a carrier for supporting appliances for the care of patients, coupling means mounted to said carrier, means for transferring said carrier, said transferring means comprising a first coupling member for cooperation with said coupling means, a support apparatus having a second coupling member mounted thereto for cooperation with said coupling means, a patient transporting means having a third coupling member mounted thereto for cooperation with said coupling means, said coupling means having engagement means for engagement of the first coupling member and one of the second and third coupling members or for engagement of only one of the first, the second and the third coupling members, locking means for locking said coupling means to one of said coupling members if a single one of said coupling members engages said coupling means and for unlocking said coupling means from said coupling members to release the respective engagement of two of said coupling members with said coupling means, and a safety member provided at said transferring means for securing said transferring means against dropping from said coupling means in an unlocked state.

2. The medical system of claim 1, wherein said coupling members are formed as projecting pegs, and said coupling means comprises recesses adapted to the shape of said pegs.

3. The medical system of claim 2, wherein said pegs and said recesses are each aligned in vertical direction.

4. The medical system of claim 3, wherein said pegs project upwardly.

5. The medical system of claim 4, wherein said pegs have a conical peripheral surface portion.

6. The medical system according to claim 2, wherein said peg mounted to said support apparatus and said peg mounted to said patient transporting means both have a recess at a first position, and said peg of said transferring means has a recess at a second position, said recesses engaging said locking means.

7. The medical system of claim 6, wherein said locking means comprises a first slider and a second slider, both sliders being spring-biased for projecting into said recesses at a location corresponding to said first position or to said second position, respectively, and for clearing said recesses when pushed against the spring bias.

8. The medical system of claim 6, wherein said recesses are formed as undercuts and said first and second positions are actually spaced in longitudinal direction of said pegs.

9. The medical system of claim 6, wherein said safety member comprises a coaxial prolongation of said peg and carries a locking bar at its upper end, said locking bar having a length which is larger than the diameter of said recess formed in said coupling means for engaging said peg.

10. The medical system of claim 9, wherein said locking bar has a width which is different from said length thereof and smaller than the diameter of said recess in said coupling member, said locking bar being mounted at said safety member for rotation between a first and a second position, and means are provided for locking said locking bar in said first and second positions.

11. The medical system of claim 1, wherein said transferring means comprises a handle.

12. The medical system of claim 1, wherein said support apparatus is a stationary support.

13. The medical system of claim 1, further comprising means for unlocking said engagement of the single one of said coupling members with said coupling means.

14. The medical system of claim 13, wherein said unlocking means comprising an outwardly projecting portion provided at a slider lockingly cooperating with first location of pegs for displacing said slider for manually unlocking said engagement.

* * * * *